United States Patent [19]
Ehrenberg et al.

[11] Patent Number: 5,679,482
[45] Date of Patent: Oct. 21, 1997

[54] FUEL CELL INCORPORATING NOVEL ION-CONDUCTING MEMBRANE

[75] Inventors: Scott G. Ehrenberg, Fishkill; Joseph M. Serpico, Troy; Gary E. Wnek, Latham; Jeffrey N. Rider, Troy, all of N.Y.

[73] Assignee: Dais Corporation, Palm Harbor, Fla.

[21] Appl. No.: 542,474

[22] Filed: Oct. 6, 1995

Related U.S. Application Data

[63] Continuation-in-part of Ser. No. 247,285, May 23, 1994, Pat. No. 5,468,574.

[51] Int. Cl.$^6$ .............. H01M 2/16; B05D 5/12; B05D 3/02; C25B 13/08
[52] U.S. Cl. .............. 429/249; 427/115; 427/385.5; 204/296
[58] Field of Search ............... 427/115, 385.5; 204/296, 242; 429/249

[56] References Cited

U.S. PATENT DOCUMENTS

| | | | |
|---|---|---|---|
| 3,247,133 | 4/1966 | Chen | 260/2.1 |
| 3,341,366 | 9/1967 | Hodgdon et al. | 136/86 |
| 3,392,096 | 7/1968 | Lawton et al. | 204/159.15 |
| 3,484,293 | 12/1969 | Hodgdon | 136/86 |
| 3,577,357 | 5/1971 | Winkler | 260/2.2 |
| 4,119,616 | 10/1978 | O'Farrell | 526/31 |
| 4,272,560 | 6/1981 | Baczek et al. | 427/115 X |
| 4,673,454 | 6/1987 | Liu et al. | 156/281 |
| 4,738,764 | 4/1988 | Chlanda et al. | 204/296 |
| 4,849,311 | 7/1989 | Itoh et al. | 429/192 |
| 5,239,010 | 8/1993 | Balas et al. | 525/314 |

FOREIGN PATENT DOCUMENTS

| | | |
|---|---|---|
| 77-036997 | 9/1977 | Japan . |
| 2124635 | 2/1984 | United Kingdom . |

OTHER PUBLICATIONS

Gray et al. "Novel Polymer Electrolytes Based on ABA Block Copolymers" *Macromolecules* 21, 392–397 (1988) No month.

Nolte et al. "Partially sulfonated poly(arylene ether sulfone) –A versatile proton..." *–J. Mem. Sci.* 83, 211–220 (1993) No month.

Narebska et al. "Microstructure of Permselective Ion Exchange Membranes" *Roczniki Chemii* 48, 1761–1768 (1974) no month.

Ceynowa et al. "Membrane Fuel Cells, Part II Decomposition in the Ion..." *Roczniki Chemii* 48, 1537–1543 (1974) no month.

Narebska et al. "Membrane Fuel cells. 1. Oxygen–hydrogen fuel cell..." *Chem. Abstr.* 83: 633454a (1975) no month.

Ceynowa et al. "Comparative investigations on cation exchange membranes..." *Chem. Abstr.* 81: 80122b (1973) no month.

Wilson et al. "Thin–film catalyst layers for polymer electrolyte fuel" *J. Appl. Electrochem.* 22, 1–7 (1992) no month.

Valint et al. "Synthesis and Characterization of Hydrophobically Associating ..." *Macromolecules* 21, 175–179 (1988) no month.

Pei et al., "Polymer Light–Emitting Elecrtochemical Cells," *Science*, vol. 269, pp.1086–1088, Aug. 1995.

Ho et al., "The Influence of Terminal Effect on the Performance of Electrochromic Windows," *J. Electrochem. Soc.*, vol. 137, No. 12, pp. 3858–3864, Dec. 1990.

*Primary Examiner*—Donald R. Valentine
*Attorney, Agent, or Firm*—Heslin & Rothenberg, P.C.

[57] ABSTRACT

Fuel cells incorporating a novel ion-conducting membrane are disclosed. The membrane comprises a plurality of acid-stable polymer molecules each having at least one ion-conducting component covalently bonded to at least one flexible connecting component. The membrane has ion-conducting components of the polymer molecules ordered such that a plurality of continuous ion-conducting channels penetrate the membrane from a first face to a second face and such that the ion-conducting channels are situated in an elastic matrix formed by the flexible connecting components. A preferred membrane is obtained by (1) sulfonating SEBS with sulfur trioxide under conditions that result in greater than 25 mol % sulfonation and (2) heating the polymer.

25 Claims, 1 Drawing Sheet

FUEL CELL INCORPORATING NOVEL ION-CONDUCTING MEMBRANE

This application is a continuation-in-part of a commonly owned, U.S. application Ser. No. 08/247,285, filing date May 23, 1994, now U.S. Pat. No. 5,468,574, entitled "Fuel Cell Incorporating Novel Ion-Conducting Membrane".

FIELD OF THE INVENTION

The present invention relates to fuel cells and in particular, to ion-conducting membranes for fuel cells and to methods of constructing the same.

BACKGROUND OF THE INVENTION

A fuel cell device generates electricity directly from a fuel source, such as hydrogen gas, and an oxidant, such as oxygen or air. Since the process does not "burn" the fuel to produce heat, the thermodynamic limits on efficiency are much higher than normal power generation processes. In essence, the fuel cell consists of two catalytic electrodes separated by an ion-conducting membrane. The fuel gas (e.g. hydrogen) is ionized on one electrode, and the hydrogen ions diffuse across the membrane to recombine with the oxygen ions on the surface of the other electrode. If current is not allowed to run from one electrode to the other, a potential gradient is built up to stop the diffusion of the hydrogen ions. Allowing some current to flow from one electrode to the other through an external load produces power.

The membrane separating the electrodes must allow the diffusion of ions from one electrode to the other, but must keep the fuel and oxidant gases apart. It must also prevent the flow of electrons. Diffusion or leakage of the fuel or oxidant gases across the membrane leads to explosions and other undesirable consequences. If electrons can travel through the membrane, the device is fully or partially shorted out, and the useful power produced is eliminated or reduced.

It is therefore an object of this invention to produce a membrane which allows the diffusion of ions, but prevents both the flow of electrons and the diffusion of molecular gases. The membrane must also be mechanically stable.

In constructing a fuel cell, it is particularly advantageous that the catalytic electrodes be in intimate contact with the membrane material. This reduces the "contact resistance" that arises when the ions move from the catalytic electrode to the membrane and vice versa. Intimate contact can be facilitated by incorporating the membrane material into the catalytic electrodes. [See Wilson and Gottsfeld *J. Appl. Electrochem.* 22, 1–7 (1992)]. It is therefore an object of the invention to produce a membrane wherein such intimate contact is easily and inexpensively made.

For reasons of chemical stability, fuel cells presently available typically use a fully fluorinated polymer such as Dupont Nafion® as the ion-conducting membrane. This polymer is very expensive to produce, which raises the cost of fuel cells to a level that renders them commercially unattractive. It is therefore a further object of this invention to produce an inexpensive ion-conducting membrane.

Ion-conducting polymers are known. (See Vincent, C. A., Polymer Electrolyte Reviews I, 1987). The known polymers are, for the most part, similar to sulfonated polystyrene because of the known ability of sulfonated polystyrene to conduct ions. Unfortunately, uncrosslinked, highly sulfonated polystyrenes are unstable in the aqueous environment of a fuel cell, and do not hold their dimensional shape.

U.S. Pat. No. 4,849,311 discloses that a porous polymer matrix may be impregnated with an ionconducting polymer to produce a fuel cell membrane. However, the ion-conducting polymer must be dissolved in a solvent which "wets" the porous polymer. When the solvent evaporates, there is sufficient porosity remaining in the porous polymer/ion-conducting polymer composite material that molecular oxygen can leak through to the fuel gas and result in an explosion.

U.S. Pat. No. 3,577,357 (Winkler) discloses a water purification membrane composed of block copolymers of sulfonated polyvinyl arene block and alpha-olefin elastomeric blocks in one example a styrene-isoprene-styrene triblock copolymer was selectively hydrogenated, then sulfonated using a premixed $SO_3$/triethylphosphate reagent at 60° C. for 1.5 hrs. A sulfonated styrene-(ethylene-propylene) copolymer was the result. The method provided solid agglomerates of the polymer which were rolled on a mill to remove water, swelled in cyclohexane, slurried in an isopropyl alcohol/water mixture, and coagulated in hot water. No membrane was produced, and we have found that polymers produced according to the method of Winkler cannot be cast into films.

Gray et al. [*Macromolecules* 21, 392–397 (1988)] discloses a styrene-butadiene-styrene block copolymer where the ion-conducting entity is a pendant short-chain of poly (ethylene oxide) monomethyl ether (mPEG) complexed with $LiCF_3SO_3$ salt and connected through a succinate linkage to a flexible connecting entity which is the butadiene block of the triblock copolymer. The ion-conducting entity in the butadiene block is in the continuous phase of the polymer, and the areas populated by the ion-conducting entities do not preferentially touch each other to form continuous ion-conducting domains. This morphology does not facilitate the ion-conducting properties that are necessary for fuel cell operation. The styrene block functions only as a mechanical support structure for the polymer. Moreover, the molecular design chosen by Gray et al. is incompatible with the working environment of a fuel cell. Because the succinate linkage which joins the mPEG to the butadiene backbone and the ether linkages which join the ethylene oxide units are subject to cleavage by acid hydrolysis, these linkages are unstable in the low pH environment of a fuel cell even for short periods of time.

In the art of battery separators, as exemplified by U.S. Pat. No. 5,091,275, a number of porous polymers and filled polymer materials are known. The pores of these polymers and composite materials are filled with, typically, a liquid electrolyte to conduct ions from one electrode to another in a battery. However, these battery separator materials allow the passage of gases, so that fuel cells made with them have an unfortunate tendency to explode as the oxygen leaks into the hydrogen side of a fuel cell.

There is therefore a need for an inexpensive, mechanically and chemically stable, ion-conducting membrane.

SUMMARY OF THE INVENTION

In one aspect, the present invention relates to a membrane comprising a plurality of polymer molecules each having at least one ion-conducting component covalently bonded to at least one flexible, rubbery connecting component. The membrane has ion-conducting components of the polymer molecules ordered such that a plurality of continuous ion-conducting channels penetrate the membrane from a first face to a second face and such that the ion-conducting channels are situated in an elastic matrix formed by the flexible connecting components. (See FIG. 1). Optimally, the channels have a cross-sectional dimension in the plane of the membrane of about 0.01 µm to 0.1 µm. In some embodiments of this invention, the polymer molecules forming the membrane are acid-stable.

The flexible connecting component may be chosen from the group and the group and the ion-conducting component may be chosen from the group wherein $R^1$, $R^2$, $R^3$ and $R^4$ are chosen independently from the group consisting of hydrogen, phenyl and lower alkyl;

$R^5$ is hydrogen, chlorine or lower alkyl;

$R^6$ is hydrogen or methyl;

$R^7$ is —$SO_3H$, —$P(O)(OR^8)OH$, —$R^9$—$SO_3H$ or —$R^9$—$P(O)(OR^8)OH$ where $R^8$ is hydrogen or lower alkyl and $R^9$ is lower alkylene;

Ar is phenyl; and m, n, p and q are zero or integers from 50 to 10,000.

The terms lower alkyl and lower alkylene include hydrocarbons having from 1 to 6 carbons in linear, branched or cyclic structure. It should be understood that the "ion-conducting component" as used herein refers to the characteristic of the component after sulfonation.

In a preferred embodiment the flexible connecting component is chosen from the group consisting of poly(alpha-olefins), polydienes, and hydrogenated derivatives of polydienes, and the ion-conducting domain is provided by a component chosen from the group consisting of the sulfonic acids of polystyrene and poly(α-methylstyrene). Most preferably, the flexible connecting component is chosen from the group consisting of poly(ethylene-butylene) and poly(ethylene-propylene) and sulfonate or sulfoxide crosslinking occurs between the polystyrene or poly(α-methylstyrene) components. Another useful membrane is an acrylonitrile-butadiene-styrene terpolymer (ABS), the styrene component of which is sulfonated.

Because the precise structure of a preferred membrane of the invention is difficult to characterize, it may alternatively be described as a highly sulfonated polymeric membrane produced by the process of:

(a) combining (i) a copolymer which Comprises at least one vinyl aromatic polymer segment bonded to at least one flexible connecting polymer segment with (ii) a sulfonation agent, under controlled reaction conditions, and within a compatible solvent system;

(b) removing a portion of the solvents from the polymer solution; and (c) casting the resulting material on a substrate, to form a membrane. The membrane so formed absorbs. The membrane so formed absorbs at least 50% of its weight in water and in its fully hydrated state can be stretched to at least 100% of its original dimension without fracture. It exhibits a conductivity of at least $10^{-5}$ S/cm in its fully hydrated state.

An especially preferred membrane of the present invention may be described as one produced by the process of:

(a) adding about a 3–4 wt % solution containing about 3.6 equivalents of styrene-(ethylene-butylene)-styrene triblock copolymer and about 0.4 equivalents of triethylphosphate in about 65/35 dichloroethane/cyclohexane with about 2.0 equivalents of sulfur trioxide in dichloroethane to a solution of about 65/35 dichloroethane/cyclohexane, at a temperature in the range of about –5° to 0° C.;

(b) stirring for about 10 to 15 minutes at about –5° to 0° C.;

(c) heating at about 80° C. for about 10 to 15 minutes until a purplish color is evident;

(d) cooling to less than about 55° C., and then adding a suitable solvent to form a polymer solution;

e) evaporating most of the dichloroethane and cyclohexane at about 40°–50° C. to obtain a viscous liquid;

f) casting the viscous liquid on a substrate to form a membrane which has the characteristics mentioned above.

The styrene-(ethylene-butylene)-styrene triblock copolymer for the process described above may have a number average molecular weight of about 50,000, and styrene units may comprise about 20 to 35 wt % of the triblock copolymer. Preferably, the membrane is more than 25 mol % sulfonated.

In another aspect, the invention relates to a fuel cell comprising: (a) the membrane described above; (b) first and second opposed electrodes in contact with the membrane; (c) means for supplying a fuel to the first electrode; and (d) means for permitting an oxidant to contact the second electrode.

In one embodiment, one of the electrodes is composed of catalytic particles and the membrane functions as a binder for the electrode. In other embodiments, both electrodes may be composed of catalytic particles and the membrane functions as a binder for both electrodes.

In a related aspect the invention relates to an electrolysis cell having the same structure as the fuel cell above.

An especially preferred membrane of the present invention may be described as one produced by the process of:

(a) adding about a 3–4 wt % solution containing about 3.6 equivalents of styrene-(ethylene-butylene)-styrene triblock copolymer and about 0.4 equivalents of triethylphosphate in about 65/35 dichloroethane/cyclohexane with about 2.0 equivalents of sulfur trioxide in dichloroethane to a solution of about 65/35 dichloroethane/cyclohexane, at a temperature in the range of about –5° to 0° C.;

(b) stirring for about 10 to 15 minutes at about –5° to 0° C.;

(c) heating at about 80° C. for about 10 to 15 minutes until a purplish color is evident;

(d) cooling to less than about 55° C., and then adding a suitable solvent to form a polymer solution;

(e) evaporating most of the dichloroethane and cyclohexane at about 40°–50° C. to obtain a viscous liquid;

(f) casting the viscous liquid on a substrate to form a membrane which has the characteristics mentioned above.

In a further aspect, the invention relates to a process for preparing a sulfonic acid ionomer of a styrene-(ethylene-butylene)-styrene triblock copolymer (SEBS), the improvement which comprises using a sulfur trioxide-triethylphosphate complex that is formed in the presence of the SEBS, whereby the SEBS is not less than 25 mol % sulfonated.

DETAILED DESCRIPTION INCLUDING PREFERRED EMBODIMENTS

Figure 1:
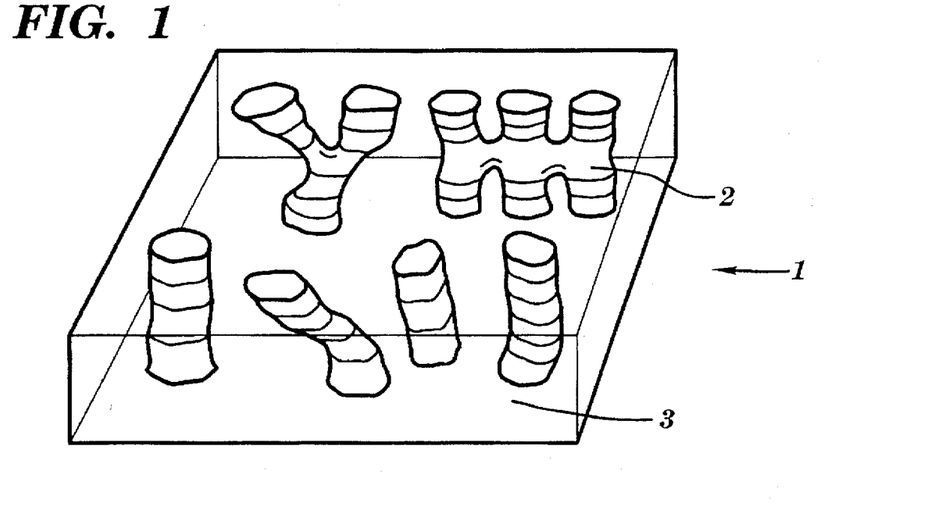
FIG. 1 is an idealized perspective view of a membrane according to the invention.

The ion-conductive polymer membrane of the invention is shown in FIG. 1 in schematic form. The membrane 1 is a multicomponent polymer composed of at least one ion-conducting component which is covalently bonded to at least one flexible component.

The minimum requirements for the ion-conducting component are that the ionic grouping (e.g. sulfonic or phosphonic acids) be a strong enough acid to provide sufficient dissociation of charge carriers (protons) in an aqueous environment, possess moderate temperature stability (up to at least 40° C.), and sufficient number of such groupings be present to potentially form a network of interconnected domains 2, which extends throughout the membrane 1 forming an ion conduction pathway from one side to the other side of the membrane. The ion-conducting component is often a vinyl aromatic polymer segment, e.g., a polystyrene-like material, as described below.

The minimum requirements for a flexible connecting component are that the main chain of the grouping possess sufficient mobility at the operating temperature of the fuel cell to facilitate reorganization of the ionically conducting component into a domain to which it is connected, and to be insoluble in the aqueous environment of a fuel cell. The domains 3 formed by the flexible connecting components should be amorphous or at least partially amorphous at the operating temperature of the fuel cell.

There are a number of ways of connecting polymer components which can result in useful ionically conducting membranes.

In this invention, a sulfonated styrene-(ethylene-butylene) triblock copolymer (example 3) was considered the most preferred embodiment because of the superior mechanical properties that this arrangement possesses. However, other topological arrangements are possible.

For multicomponent polymers, the repeating units of each of the components can be connected in different sequences depending on the method of synthesis. The A and B units are connected in a sequence by covalent bonds such that the expression $[(A)_n(B)_m]p$, describes the polymer microstructure. If n units of A are covalently bonded to m units of B in sequences (p is arbitrary) where the stochastic process followed is Bernoullian (or zero-order Markov) then the polymer is a called a random copolymer. (The stochastic process followed depends on the relative reactivities of the two monomers in the copolymerization; see Odian, G., Principles of Polymerization, 1992.) However, if the stochastic process which the sequence of A and B units follow is not Bernoullian (e.g. terminal model or first-order Markov) then polymer is called a statistical copolymer.

Limiting cases exist for which the relative reactivities of the two monomers (A prefers to add B and B prefers to add A) result in the sequence —AB— to be repeated p times (for m=n) and this is called an alternating copolymer.

A second limiting case exists where (A prefers to add A and B prefers to add A until A is consumed, then B is added) the polymer is composed of two components, A and B, and n units of A are covalently bonded at one junction point (p=1) to m units of B, then each of these sequences of component s is called a block and the polymer is called a diblock copolymer. Similarly, if a third block of n units of A is bonded at a second junction point (p=2) on the B-block, then the polymer is called a triblock copolymer (and equivalently if a third block of m units of B is bonded to A).

If a sequence of m units of B are bonded to a sequence of n units A at one or more branch points (p≧1) along the sequence of m units of B then the polymer is called a graft (or graft-block, for p=1) copolymer.

Multi-block polymers, where p is the number of junction points for p+1 blocks, can also be envisioned as well as the less common star-block copolymers, where p is the number arms connected at one or more branch points.

Combinations of these types (e.g. statistical/block or statistical/graft) are also possible. Random, statistical and combination terpolymers are polymers which possess three unique units in the microstructure. An example is acrylonitrile-butadiene-styrene terpolymer where the butadiene or styrene-butadiene units compose the main chain and at various branch points a statistical arrangement of styrene and acrylonitrile units are positioned (i.e. statistical/graft).

A preferred embodiment of this invention is a graft copolymer of sulfonated styrene and butadiene where the sulfonated styrene block is covalently bonded to the butadiene block (or sulfonated styrene-butadiene sequence) at one or more branch points along the butadiene chain.

Another preferred embodiment of this invention is the combination statistical/graft of acrylonitrile-butadiene-sulfonated styrene terpolymer. A more preferred embodiment is the hydrogenated butadiene analog of each of the forementioned preferred embodiments.

The sulfonation of the styrene units of each of these topological arrangements can be achieved by the synthetic method described below. The introduction of sulfonate groups (e.g., by use of a sulfonation agent) onto polystyrene is known. Early methods involved heating the polymer in sulfuric acid for hours; an improved method employs silver sulfate added to the sulfuric acid as a catalyst. More recently, complexes with a number of agents such as phosphorus pentoxide, triethyl phosphate and tris (2-ethylhexyl) phosphate have been used to modulate i.e., moderate the reactivity of sulfur trioxide. Acyl sulfates, formed by premixing, include sulfuric acid/acetic anhydride, sulfur trioxide/acetic acid, sulfur trioxide/lauric acid, and chlorosulfonic acid/lauric acid. It has been suggested that the reduced reactivity of acyl sulfates results in better sulfonation control than was observed in previous methods with virtually no crosslinking. In addition, chlorosulfonic acid and trimethylsilyl-sulfonyl chloride have been found useful. Each requires hydrolysis to obtain the desired sulfonic acid. All of the above processes are conveniently carried out in chlorinated solvents (e.g.

1,2-dichloroethane, trichlorobenzene, methylene chloride, etc.) However, hydrocarbon solvents have been used with some success (e.g. cyclohexane).

Methylene units are readily inserted between the sulfonate group and the phenyl group by first carrying out an acylation of the ring with an α, ω-acyl/alkyl dichloride of desired carbon length and then transforming the chloride into the sulfonate. Polymers having improved temperature stability can often be obtained by the insertion of the methylene unit.

A unique route to sulfonated polymers is the use of sulfur dioxide and chlorine gases to chlorosulfonate polymers such as polyethylene. Again, the procedure requires hydrolysis to obtain the protonic form of the polymer.

Alternatively, it is possible to first sulfonate the monomers then to carry out the polymerization. The sulfonated monomers (protonic form) are sometimes polymerized in the sodium salt form or can be protected by forming the sulfonyl ester then polymerized. Ion exchange or hydrolysis follows to obtain the protonic form of the polymer.

Although less known, the phosphonation of polystyrene is also a viable route to ion-conducting groups. Phosphonic acid groups and alkyl substituted phosphonic acid groups may be introduced onto the polymer by alkylation with the corresponding chloroalkyl phosphonates or phosphonation with alkyl phosphites.

For the purpose of this invention, possible ion-conducting groups include —$SO_3H$ and $P(O)(OR^8)OH$ wherein $R^8$ is hydrogen or lower alkyl.

The most preferred ionic conducting groups are poly (styrene sulfonic acid) and poly(alpha-methyl styrene sulfonic acid). Poly(styrene sulfonic acid) and poly(alpha-methyl styrene sulfonic acid) may be analogously prepared and used.

The flexibility of a block or sequence of units which is covalently bonded to an ion-conducting group is an important object of this invention. Chain flexibility is associated with the glass transition temperature of the polymer, block or characteristic sequence of units. The glass transition temperature (or Tg) is the temperature at which large scale (translational and rotational) molecular motion of chains begins. Thus, it follows that above the glass transition temperature (i.e. Tg+50) the chains possess more mobility than below Tg (i.e. Tg−50). The Tg of a polymer is largely a function of the bonding, the nature of the atoms in the chain, the secondary forces, the chain substitution and chain connectivity.

The melting temperature of a chain-folded crystallite, $T_m$, has an effect on the chain flexibility. Because chains which crystallize are tied up in the crystalline regions, these have considerably less mobility. A good approximation for a linear hydrocarbon polymer is that the Tg is ⅔ the value of its Tm.

The crystallization of polymer chains can be reduced or eliminated by incorporating a nonsymmetrical (or symmetry-breaking) unit into the chain structure (e.g. introducing butylene units into polyethylene to give rise to ethylene-butylene polymers). This process has the effect of reducing crystallinity and increasing flexibility. For simplicity, Tg is used as a measure of chain flexibility.

Preferred flexible connecting groups of saturated origin are described by the formula, wherein $R^1$, $R^2$, $R^3$ and $R^4$ are independently hydrogen or lower alkyl. When $R^1$, $R^2$ and $R^3$ are hydrogen and $R^4$ is n-butyl, then the structure is ethylene-butylene.

The most preferred embodiment of the flexible connecting group is ethylene-butylene. The next most preferred is when the flexible connecting group is ethylene-propylene. The preparation of ethylene-butylene and ethylene-propylene are well known in the art.

Preferred flexible connecting groups of unsaturated origin are described by the formula, wherein $R^5$ is hydrogen, chlorine or lower alkyl. When $R^5$ is H, the structure is poly(1,4-butadiene); when $R^5$ is Cl, the structure is poly(chloroprene); and when $R^5$ is methyl, the structure is poly(1,4-isoprene). The preparation of poly (butadiene), poly(isoprene), poly(chloroprene) and their isomers are well known in the art.

The 1,2 isomers of polymers are also included in this set of unsaturated origin (with 1,4 isomers). It should be noted that different amounts of 1,2 isomers will be present in the 1,4 isomers depending on the catalyst used in the polymerization.

The molecular weight of the polymer should be preferably no-less than 10,000 g/mol and most preferably be greater than 50,000 g/mol for adequate mechanical strength. A membrane thickness of 25–1000 μm, preferably 100–500 μm and most preferably 250–350 μm provides sufficient mechanical integrity to produce free-standing, useful membranes with enough ion-conductivity to cause acceptably low voltage drops under working conditions.

As measured by ac impedance analysis, the room temperature ionic conductivity of the fully hydrated membranes must be at least $10^{-6}$, preferably at least $10^{-4}$ and most preferably at least $10^{-2}$ S/cm. The electronic resistivity due to electron flow must be at least $10^2$, preferably at least $10^4$ and most preferably at least $10^6$ Ohm-cm.

As measured by analytical weight uptake measurements, the membranes should absorb between 10 and 150%, preferably between 30 and 100%, and most preferably between 50 and 80% water by weight. In the fully hydrated state, membranes can be stretched at least 10%, preferably 25%, and most preferably at least 50% of their original length.

The general requirements needed for a copolymer film to function well as fuel cell membrane are that the copolymer possess a flexible connecting component, such as a hydrogenated butadiene unit and an ion-conducting component. These two units must occur in the polymer, such as a sulfonated styrene unit, in such a way that the morphological structure of the polymer can give rise to a plurality of low resistance, ion transport pathways. The pathways are composed of a plurality of touching ion-conducting domains which are presumed to be elongated and organized into a cylindrical or channel type structure. A limited number of copolymers can be envisioned which can exhibit these types of structures.

Commercially available styrene-diene and styrene-hydrogenated diene triblock copolymers (Shell) are preferred membrane materials. The styrene content of between 28-31 wt % provides domains of elongated cylindrical morphology when cast from the appropriate solvent. The cylinders of polystyrene are apparently retained after sulfonation. These cylindrical domains of the styrene material are aligned parallel to each other in a grainy structure, each domain being separated by a layer of the elastomeric material which connects adjacent domains together.

Such a mixture of cylindrical conducting material, each cylinder separated from the next by a non-conducting material, would be expected to be non-conducting. We have found however, that when the material is sulfonated, and when it is then hydrated, that the sulfonated polystyrene domains swell and presumably punch through the surrounding elastic material to allow contact between neighboring cylinders. This contact presumably connects the aligned cylinders to each other end to end, and the conductivity is higher than that which one would expect from normal percolation models.

Diblock copolymers that can exhibit cylindrical domains can also be obtained commercially. Although they do not take advantage of the interconnected morphology of triblock copolymers, the insolubility of the hydrogenated butadiene units may be enough impart the required amount of mechanical integrity for fuel cell membranes. These can be hydrogenated using conventional methods (Wilkinson's catalyst) known to those skilled in the art. They may be sulfonated as easily as their triblock copolymer counterparts.

Graft copolymers are also available commercially or they may be isolated from commercial polymer resins. An example is high impact polystyrene (HIPS) which has a graft copolymer content of about 15% by weight. The grafted part may be extracted with an acetone-methyl ethyl ketone mixture. Similar transformation reactions can lead to a sulfonated styrene-hydrogenated butadiene copolymer. These can also exhibit morphologies possessing channels.

Controlled monomer feed conditions can provide random or statistical copolymers which possess chemical microstructures with various degrees of 'blockiness', where short sequences of styrene units are obtained. Segregated network type structures may then be possible. However, such substrates are inferior to those described above. A statistical copolymer of styrene-hydrogenated butadiene rubber when sulfonated may be capable of organizing into channels.

The exploitation of elastomers such as acrylonitrile-butadiene-styrene (ABS), acrylonitrile-chlorinated ethylene-styrene (ACS and ethylene-propylene-diene (EPDM) polymers may also be possible, if the morphologies of these polymers are capable of organizing into channels after sulfonation. ABS, which is a butadiene backbone with a statistical copolymer of acrylonitrile-styrene grafted onto it, may exhibit channels after selective hydrogenation of butadiene followed by sulfonation of the styrene units.

A mixture of block copolymer and the hompolymer could also be used. At low percentages of the homopolymer, the block copolymer would determine the morphology of the material.

ACS is similar in preparation to ABS. It is prepared by partial dehydrohalogenation of chlorinated polyethylene leading to double bonds which can be subsequently reacted to produce acrylonitrile-styrene grafts; the styrene units are then sulfonated. Channels may be possible at a critical styreric composition.

Ethylene-propylene-diene, the diene usually being hexadiene, may be sulfonated using methods described herein. At a critical composition of the diene, a channel structure may be possible.

The specific techniques for preparing the highly sulfonated polymeric membrane of the present invention can be varied to some degree by those skilled in the art, with the proviso that the characteristics noted above are obtained, e.g., water absorbency, "stretchability" without fracture, and suitable ionic conductivity. In general, less than a stoichiometric amount of the sulfonation agent is used in conjunction with the copolymer containing the ion-conducting segment and flexible connecting segment. As an example, when the copolymer is styrene-based, enough sulfonation agent is provided to theoretically react with at least about 15% of the available styrene molecular units, and preferably, about 40% to about 60% of the styrene molecular units. Higher sulfonation levels can sometimes decrease the strength of the membrane films when they are hydrated.

Moreover, "controlled reaction conditions" are those which allow substantially complete sulfonation (based on the amount of sulfonation agent added) of the ion-conducting units (e.g., styrene) without unwanted side reactions. These conditions should also result in a film which is highly conductive, highly water absorbent, and very stretchable, as described herein. In some preferred embodiments, controlled reaction conditions include the initial mixing of the copolymer and sulfonation agent at a temperature below about 5° C., followed by mixing at an elevated temperature until a purplish color appears in the mixture. The "elevated temperature" itself (e.g., a temperature from about room temperature up to about 80° C.) can be reached in at least two stages, e.g., mixing for a period of time at a temperature below about 0° C., followed by heating the mixture at its boiling point (i.e., the boiling point of the solvent system) for about 10 to about 15 minutes. Usually, the reaction is deemed to be sufficiently complete when a purplish color appears.

A temperature lower than the boiling point of the mixture may be utilized if longer heating times are employed. Based on the teachings herein, those of skill in the art will be able to vary the various material parameters and reaction/casting conditions to suit a particular situation.

The same teachings are applicable to the use of the "compatible solvent system" term, as described previously. In general, those of skill in the art can select suitable solvents or solvent mixtures for the reaction described above. In general, the initial solvent is one in which the copolymer remains soluble and not excessively viscous. The solvent should also be one in which the sulfonation agent does not react with the solvent system itself. For styrene-based block copolymers, a mixture of solvents is usually preferred, e.g., a mixture of a halogenated solvent like dichloroethane and a hydrocarbon solvent like cyclohexane, in a ratio which ranges from about 99:1 to about 40:60, with a ratio in the range of about 80:20 to about 60:40 being preferred. Examples of other halogenated (e.g., chlorinated) solvents are methylene chloride and ethylene chloride, while examples of other hydrocarbon solvents are pentane, hexane, and heptane, as well as cyclic versions of these solvents. Other solvents or solvent combinations might also be suitable, based on these teachings.

After reaction is complete, the reaction mixture may then be dissolved in a solvent which is appropriate for forming a polymer solution. Various polar solvents are usually suitable for this purpose, when styrene/sulfonic acid-based copolymers have been used. Examples are ethanol, propanol, butanol, and pentanol, with n-propanol often preferred. Most of the initial solvents) used is (are) then usually removed (e.g., about 90%-99%), to obtain the viscous liquid. The viscous liquid may be then cast on a substrate to form a membrane.

Techniques for casting the material which will form the ion-conducting membrane of the present invention are known in the art. A particular technique is not critical, and an exemplary procedure is as follows:

ILLUSTRATIVE CASTING PROCEDURE

Determine the weight % solids of a membrane-forming polymer solution (as described previously) by weighing about 3 grams into an aluminum pan (56 to 70 mm in diameter), and then heating at about 45°–50° C. until the polymer solution is completely dried. Record the weight of the casting dish. Measure the surface area (in square centimeters) of the casting dish and multiply by 0.025 cm. This provides the total volume of the final film assuming the density of the polymer is approximately equal to 1 g/cm$^3$). Divide the total volume by the weight % solids. This provides the total weight of polymer solution to be used for casting a film. Weigh the polymer solution into an 8 dram vial and pour into the casting dish (a slight excess, approximately 0.7 grams, should be weighed to account for material sticking to the sides of the vial). Tightly wrap an aluminum foil cover that has been perforated with small pin holes over the top of the casting dish. The casting dish should be placed on a level surface. Approximately 24 hours after casting, heat the film using a low heat IR lamp for about 16 hours (the aluminum cover should remain in place during this step). Remove the cover and heat under a high intensity IR lamp for about 2 hours. Weigh the casting dish with the dried film and divide by the initial polymer solution weight (this is provides a check on the initial weight % solids). Then, hydrate the film by filling the casting dish with water. Decant the excess water and refill the dish at least three times to remove any water-soluble material. Remove the film from the dish and allow it to air-dry on a piece of Teflon.

Obviously, the quantities stated above will be adjusted proportionately to accommodate other desired film dimensions.

Various additives may be incorporated into the material forming the polymeric membrane, to enhance one or more characteristics of the membrane. For example, an an ioxidant agent may be combined with the copolymer material, to prevent or reduce the oxidative degradation of the membrane. While the inventors do not wish to be bound by any particular theory, it is believed that free radical oxidative degradation reactions occur when the radicals are formed as byproducts of the fuel cell reactions, leading to breakage of the carbon-carbon bonds of the polymer chains of the membrane. Degradation of the membrane in turn tends to decrease its intrinsic ionic conductivity, eventually leading to poor electrochemical efficiency and loss of performance. Most antioxidants act as free radical scavengers, reducing the incidence of the free radical-based degradation reactions.

Antioxidants which may be suitable for this use are known in the art. Illustrative examples are hindered phenolic compounds and oligomers containing hindered phenolic compounds. Specific examples of the compounds include butylated hydroxy toluene (BHT) and butylated hydroxy anisole (BHA). An example of the oligomeric resin containing a hindered phenolic group is phenol-formaldehyde and branched derivatives thereof. The hindered phenolics can be modified to suit particular purposes as well. For example, a substitution of the methyl group at the 4-position of BHA with a long hydrocarbon chain (e.g., one having at least about 4 carbon atoms) would be expected to improve the solubility of the compound in one of the domains of the membrane, e.g., in the diene domain of a styrene-diene-styrene triblock copolymer.

The most suitable level of antioxidant can be determined without undue experimentation, based in part on a review of the particular materials being used to form the membrane, as well as the inherent characteristics of the antioxidant. Usually, such material would be used at the level in the range of about 0.1% by weight to about 5% by weight, based on the total weight of the copolymer forming the membrane.

The membrane of the present invention may be utilized as an integral feature of a direct methanol fuel cell (DMFC). This type of fuel cell, in which a methanol/water solution is used as the "fuel", rather than hydrogen, is known in the art. One key factor in the performance of a DMFC depends on the ability of the membrane to absorb water in order to conduct protons, yet not absorb and allow the significant transport of methanal, as this severely limits the cell voltage. The methanol cross-over rate from anode to cathode in a fuel cell utilizing the membrane of the present invention is much less than that for commercial membranes. However, in order to further reduce methanol cross-over, an acidic agent capable of reacting with the methanol to form a methyl ester can be incorporated into the polymer forming a membrane. Formation of the methyl esters is thought to shift the equilibrium reaction of carboxylic acid-methanol in a direction which lowers cross-over rate.

Examples of suitable carboxylic acids include acetic acid, propionic acid, acrylic acid, methacrylic acid, saturated fatty acids, unsaturated fatty acids, and polyfunctional carboxylic acids such as citric acid. Polymers containing carboxylic acids would also be used, such as polymethyacrylic acid). Carboxylic acids would typically be used at a level in the range of about 5% by weight to about 25% by weight, based on the weight of the copolymer forming the membrane.

Various techniques for introducing the carboxylic acids could also be employed. For example, the acid could be mixed with the copolymer solution prior to casting. Alternatively, the carboxylic acid could be polymerized within the membrane, via a free radical reaction. Such a reaction is known in the art and can be initiated by peroxides or high energy radiation. A cross-linking agent may also be used in the reaction to form an interpenetrating polymer network.

In yet another embodiment, the polymer membrane of the present invention may be used as an electrolyte in the electrochromic cell of a device. For example, an electrochromic window is essentially a transparent electrochemical battery which includes three primary components: an electrochromic working electrode, an electrically conductive counter-electrode, and an electrolyte.

Electrochromic devices utilizing ion-conducting polymers are known in the art and described, for example, by K. Ho et al. in "The Influence of Terminal Effect on the Performance of Electrochromic Windows", J. Electrochem. Soc., 137, 3858, (1990), the contents of which are incorporated by reference. The polymer used as the electrolyte is colorless and transparent. An exemplary electrochromic cell described in the Ho et al. article utilizes tungsten oxide on a transparent electrode such as $SnO_2$:F and a counter-electrode of, for example, copper or nickel in the form of a fine grid. An electrolyte used in such a system has been a thermally-cured poly(2-acrylamido-2-methylpropane sulfonic acid). Replacement of this material with the membrane of the present invention can also result in a functioning electrochromic cell. These cells can in turn be utilized in a variety of applications. For example, they can be an integral component of a "smart window", in which light transmission in a window or transparent film can be regulated by an external switch.

Additional embodiments of the present invention are directed to galvanic cells, in which the electrolyte is based on the membrane described previously. Galvanic cells are obviously well-known energy-conversion devices. They are generally described, for example, in The New Encyclopaedia Britannica, Macropaedia, Volume 18, (1994) 393 et seq., the contents of which are incorporated herein by reference. Primary batteries are exemplary types of galvanic cells, and include magnesium-manganese dioxide cells, mercuric oxide-zinc cells, and silver oxide-zinc cells.

Of particular interest for some embodiments in the present invention are the lithium cells, which usually include a lithium anode. Various types of lithium cells are known in the art and fall within the scope of the present invention. Examples include lithium-iron sulfide cells, lithium manganese dioxide cells, lithium-carbon monofluoride cells, lithium-thionyl chloride cells, lithium-sulfur dioxide cells, and lithium/carbon(e.g., graphite) cells. Because of the high chemical activity of lithium, electrolyte selection is very important. The membrane of the present invention (which can be used as the electrolyte) is an excellent proton conductor when hydrated. The polymer forming the membrane can be neutralized to form, for example, lithium or sodium salts, and then dried. The resulting films can be plasticized to form an alkali metal ion conductor. Such a material is flexible and inexpensive to manufacture, and would perform well as the electrolyte in the lithium cell.

Examples of suitable flexibilizing agents include propylene carbonate, ethylene carbonate, and glycol ether-type materials such as ethylene glycol dimethyl ether (qlyme) and diethylene glycol dimethyl ether (diglyme). Mixtures of plasticizers are also possible.

Still another embodiment of the present invention is directed to a polymer light-emitting electrochemical cell (LEC), in which the active medium comprises the membrane of the present invention. LECs are described by Q. Pei et al. in "Polymer Light-Emitting Electrochemical Cells", Science, 269, 1086 (1995), the contents of which are incorporated by reference. In these types of cells, a p-n junction diode is created in situ through simultaneous p-type and n-type electrochemical doping on opposite sides of a thin film of a conjugated polymer. The polymer usually contains an electrolyte to provide the necessary counterions for doping. Devices based on these conjugated polymers operate by an electrochemical oxidation-reduction mechanism. During the electrochemical doping stage, a conjugated polymer which can be made sufficiently ionically-conductive is usually required. An example of such a polymer is poly(1, 4-phenylene vinylene) (PPV). The ionic nature of these polymers can often be enhanced by the incorporation of an additional ion-transport polymer, such as polypethylene oxide) (PEO). The polymer blend can be sandwiched between two metal electrodes, as described in the Pei article. The sulfonated copolymer of the present invention can be used in place of PEO to enhance ion-transport.

The LECs can be prepared by the techniques described in the Pei article. They can be made in a sandwich configuration, where the polymer blend is sandwiched between the metal electrodes, or they can be made in a surface configuration with interdigitated electrodes. An LEC can be fabricated with the semiconductor polymer in its neutral form, and with stable metals as the contacting electrodes. The electrochemically-induced p-n junction can be generated in situ.

The use of a small, organic cationic molecule in place of the conjugated polymer may also be possible for LECs based on this invention. Non-limiting examples are anthracene, naphthalene, pyrene, stilbene; pyridines such as 2,2' bipyridine with or without a complexed transition metal ion); thiophene, and terthiophene, as well as any derivatives of these compounds.

Applications for LECs are expected to greatly increase in scope. They may be used for signal-activated light transmission in flexible plastic or glass tubes and sheets. They may also be utilized in LED displays. All of these applications can benefit from the insertion of a polymer membrane of the present invention in the cell.

EXAMPLES

The fuel cell assembly used in all experiments was a low pressure clamping cell, an electrochemical test stand was used for collecting data and porous carbon catalyst electrodes (20% Pt on carbon) were all obtained from Electrochem, Inc., Woburn, Mass. The carbon electrodes had a platinum loading of 1 $mg/cm^2$ of flat area and Nafion 117 was used as the binder (see Gottesfeld, S. and Wilson, M. S., J. Appl. Electrochem., 22, 1, 1992). Commercial hydrogen and oxygen gases were used without pressurization or humidification. The experiments were carried out at room temperature (23° C.).

The ionic conductivity measurements were carried out with a 1260 impedance analyzer from Schlumberger Instruments, inc., Burlington, Mass. A hydrated film was inserted between the two blocking electrodes of a spring-loaded cell. A 5 mV ac voltage was applied. The frequency range of the experiment was 50 mHz to 1 MHz. The method is similar to that described by Vincent, C. A., Polymer Electrolyte Reviews I, 1987. Conditions and equipment in the subsequent examples are those described here except where specified.

EXAMPLE 1

Fuel Cell Performance of Nafion 117
(Comparative)

The Nafion 117 membrane was obtained from Dupont, Wilmington, Del. and was used as received. After one week of immersion in distilled water, the ionic conductivity of the membrane was measured to be $5\times10^{-7}$ S/cm. In a typical experiment Nafion was hot pressed between two porous carbon catalyst electrodes (Electrochem Inc., Woburn, Mass.) using low pressure. The carbon electrodes had a platinum loading of 1 $mg/cm^2$ of flat area and incorporated Nafion 117. The Nafion membrane was immersed in distilled water for thirty minutes-prior to testing. The fuel cell produced 5 $mA/cm^2$ at 400 mY for a short period of time (ca. 10 min.). However, a steady drop in current and voltage was observed over the next 25 minute period as the membrane dried out. After this time, the cell was completely dried out with zero current and voltage. Frequently, after the cell was disassembled to check for water retention, it was found that the electrodes had separated from the membrane.

EXAMPLE 2

Preparation and Testing of an Ionically Conductive, Sol-Gel Impregnated, Microporous Polyethylene Membrane (Comparative)

1. The Sol-Gel Formulation: To a dry 250 ml beaker fitted with a magnetic stir bar, 8.68 grams (0.042 mol) of tetraethoxysilane was added. While stirring 51.76 grams (0.215 mol) of phenyltriethoxysilane (PTES) was added, and 11.50 grams (0.25 mol) of absolute ethanol. Next 17.5 grams (0.28 mol) of concentrated nitric acid (70.6% by weight) was added dropwise over the course of about 15 minutes. A clear, low viscosity liquid was obtained.

2. Impregnation of Microporous Polyethylene Membranes (Evanite Fiber Corporation, Corvalis, Oreg.): Enough of the liquid was poured into a shallow, glass vessel (e.g. watch glass) to a depth of about 5 mm. Membranes (2 in.×2 in.) were immersed into the liquid. The membranes were allowed to soak until the solution completely permeated them. Next, the membranes were turned over in the vessel to ensure homogeneous infiltration of the liquid. The membranes were allowed to soak for 2–3 minutes. The membranes were removed, placed on a Teflon® sheet for several minutes to remove excess liquid, then hung on clip for 8 hours to cure. In one case, sulfonated PTES (see step 4) was used at this stage instead of sulfonating (in step 3) after impregnation.

3. Sulfonation of the Silane impregnated Membranes: Sulfonation was carried out by immersing the silane impregnated membrane into hot, concentrated sulfuric acid (97% by weight) at 60°–70° C. The residual acid was remove by immersing the sulfonated membranes into distilled water. The degree of sulfonation was controlled by the time of immersion in the sulfuric acid (ca. 30 min.).

4. Sulfonation of Phenyltriethoxysilane (PTES): About 14.94 grams (0.108 mol) of triethyl phosphate-sulfur trioxide complex (1:3) was dissolved in 100 ml of dry methylene chloride and the solution was carefully added to a graduated addition funnel. To a dry 250 ml 3 neck round bottom flask fitted with a condenser, argon purge line and addition funnel, 25.88 grams (0.108 mol) of PTES and 25 ml of methylene chloride were added. The reactor was cooled to −4° to −2° C. The $SO_3$ solution was slowly fed to the reactor while keeping the reaction temperature <−2° C. Upon completion of the addition, the reaction temperature was held at <−2° C. for thirty minutes. Next, the reactor was allowed to come to room temperature (−23° C.). Most of the solvent was vacuum stripped from the sulfonated PTES. Alternatively, a similar compound 2-(4-chlorosulfonylphenyl) ethyltrimethoxysilane (Huls, Piscataway, N.J.) was used in place of sulfonated PTES. The acid was produced by immersing the cured membranes in boiling water.

5. Experimental Results: The membranes were immersed in distilled water, shaken dry of adherent water and sandwiched between two porous platinum wire electrodes. The sulfonated membranes gave stable current (ca. 50 mV at 4 mA/cm$^2$) for approximately 30 minutes. After this time, the current began to fall precipitously, because of excessive oxygen/hydrogen gas leakage. In more than a few experiments, oxygen and hydrogen reacted explosively, emitting puffs of smoke from the hydrogen gas outlet port, resulting in a unsightly hole in the membrane.

EXAMPLE 3

The Preparation and Testing of Sulfonated Styrene-(Ethylene-Butylene)-Sulfonated Styrene Triblock Copolymer 1. Preparation of Sulfonated Styrene-(ethylene-butylene) Triblock Copolymer: The styrene-(ethylene-butylene)-styrene triblock copolymer (SEBS) was obtained from Shell Chemical Co., Lisle, Ill. under the tradename Kraton®. A 3.8 wt % solution of the SEBS copolymer was prepared in a solvent mixture having a composition of 80 wt % 1,2-dichloroethane (DCE) and 20 wt % cyclohexane. The dissolution sequence was as follows: About 10 grams (0.03 mol, 3.1 grams styrene) of the triblock copolymer was added to 200 grams of DCE and allowed to mix for 2–4 hours. A cloudy emulsion was obtained. Warming the solution favored the formation of a slightly tinted polymer microemulsion. About 53 grams of cyclohexane was added and after stirring for a few minutes a clear solution was obtained. The polymer solution was transferred to a 500 mL dropping funnel.

Sulfur trioxide ($SO_3$) was weighed out into a glass vessel while in an inert gas glove bag. A 3.4 wt % solution of $SO_3$ in DCE was prepared. About 2.34 grams (0.03 mol) of $SO_3$ (bp 17° C.) was dissolved in 66 grams of DCE. The solution was transferred to an appropriate dropping funnel.

A resin kettle (reactor) was fitted with an electric motor using a variable transformer, a paddle, an argon gas inlet/outlet, oil bubbler, two Claissen adaptors, and the two dropping funnels. The reactor was charged with 262 grams of DCE and 1.5 grams (0.0082 mol, 3.6:1 $SO_3$) of triethyl phosphate (TEP). Vigorous agitation and inert gas purge was begun and the reactor was cooled to −2° C. in an ice/ethanol Dewar. The $SO_3$ and polymer solutions were added alternately dropwise to the reactor in small aliquots. The aliquot size (e.g. 4–5 ml for $SO_3$) was roughly $1/12$ the total volume of each of the solutions. The aliquots were added slowly, over the course of 5 minutes for the $SO_3$ and over the course of 5–10 minutes for the polymer. A rapid inert gas stream, a temperature range of −5° to 0° C. (−2° C. nominal), and vigorous stirring were maintained throughout the course of the reaction. After all of the aliquots for each of the solutions had been added, the reaction was left stirring at low temperature for between 15 and 20 minutes. At the end of this period the extraneous glassware was removed, the orifices were capped, and the paddle assembly was replaced with a stir bar and a magnetic stirrer. The reactor was allowed to stir overnight and warm up to room temperature (20°–25° C.).

The mixture was filtered through coarse filter paper. The liquid (filtrant) was transferred to a beaker and heated to boiling on a hot plate until a distinct purple color was apparent (after about 30–40 minutes). The solution was concentrated on a rotary evaporator at 40° C. and partial vacuum until a viscous purple liquid was obtained. Next, the viscous liquid was resuspended in about 62 grams (enough for a 3–5 wt % solution) of DCE. The DCE was allowed to evaporate until undissolved gel was formed on the walls of the container (about 8–10 wt % solution). The liquid was decanted and enough cyclohexane was added to dissolve a large portion of the undissolved gel. The two solutions were mixed and concentrated by evaporation (roughly 80% DCE) until a fine dispersion of the polymer was obtained.

This dispersion was cast onto Teflon® and onto aluminum substrates to form a highly conducting membrane. The membrane absorbs at least 50% of its weight in water. The film could be stretched as much as 100% of its original length. As measured by ac impedance analysis, the room temperature, dc conductivity of the fully hydrated film was no less than $10^{-5}$ S/cm.

The polymer was 50 mol % sulfonic acid based on the styrene content from titration, and the solution was heated to boiling and held until it turned a red-purple color.

There are two features of the foregoing process that appear important to producing useful polymers:

(1) sulfonating to high sulfonate levels, and (2) heating the sulfonation mixture after sulfonation. Heating of the sulfonation reaction solution is necessary for the formation of a viscous dispersion (5–10% solids) which can be cast into films. The dispersion is not formed unless heated and only after a red-purple solution is obtained. It is believed that the heating step may cause decomposition of sulfonate groups and/or crosslinking through sulfone or sulfonyl ester linkages, although applicants do not wish to be held to this theory.

The process of the invention provides a film which is sulfonated to a level of 53 mol%. This level of sulfonation is attainable in about 1.5 hrs at −3° C. In the procedure of Winkler (U.S. Pat. No. 3,577,357), the sulfonation was also carried out for 1.5 hrs but at 60° C. However, as described in a comparative example in U.S. Pat. No. 5,239,010, the procedure of Winkler results in a polymer with only 10 mol % sulfonation. The water adsorption of such a film would be about 5%. This would indicate that even if Winkler's polymer could be cast, it would probably not function well as an ion-conducting membrane.

1(a). Alternative Preparation of a Sulfonated SEBS Triblock Polymer

Sulfonation of the styrene-ethylene/butylene-styrene (SEBS) triblock copolymer was carried out in a batch mode, using a one liter resin flask. The materials were: SEBS G1650, acquired from Shell Chemical; dichloroethane (DCE), cyclohexane and 1-propanol from Krackeler Scientific; triethyl phosphate (TEP) and sulfur trioxide ($SO_3$) from Aldrich Chemical.

Procedure: The DCE and cyclohexane were dried using molecular sieves. To a clean dry breaker, 10 g of SEBS, 200 g of DCE, 100 g of cyclohexane, and 1.2 g of TEP, were added. This solution was mixed until the polymer had completely dissolved. The solution was then transferred to a graduated dropping funnel. In a nitrogen atmosphere glove bag, 1.7 g of $SO_3$ was dissolved in 100 g of DCE, then transferred to a graduated dropping funnel. 200 g of DCE and 100 g of cyclohexane were added to a one liter reaction flask equipped with a paddle mixer, which was cooled to between −2° C. and −4° C. When the reactor charge was cool enough, the polymer and $SO_3$ solutions were fed simultaneously over a 70 to 80 minute period, while maintaining a reaction temperature of less than 0° C. This temperature was maintained until 10 to 15 minutes after the end of the feeds. The reaction was then boiled (approx. 76° C.) for 10 to 12 minutes. After cooling to room temperature, 90 g of 1-propanol was added, with stirring. Once the polymer had dissolved, the solvents were removed by rotary evaporation, at 50° C., until a 10 wt/% solution was obtained.

2. Fuel cell Performance of Sulfonated SEBS: The membrane prepared in Example 3, Section 1 was immersed in distilled water, shaken dry of adherent water and sandwiched between two porous carbon catalyst electrodes. Initially, the fuel cell produced 50 mA/cm$^2$ at 400 mV and continued to improve. After 72 hours the current climbed to 115 mA/cm$^2$ at 450 mV.

The same features of the membrane that lend themselves to its use in fabricating fuel cells also render it suitable for use in fabricating an electrolysis cell for electrolyzing water to hydrogen and oxygen. The electrode processes that occurred in the fuel cell to produce electrical energy and water by consuming hydrogen and oxygen can be reversed to consume energy and produce hydrogen and oxygen from water. A voltage is applied across the cell to oxidize water to oxygen and protons, and the protons are allowed to pass through the membrane to the cathode, where they are reduced with concomitant production of hydrogen gas. Water is continuously supplied to the anode, and hydrogen and oxygen are drawn off the cathode and anode respectively. The most immediate utility of such a cell is as a power storage device wherein the hydrogen and oxygen so produced are stored and reused to power the fuel cell upon demand.

Figure 2:
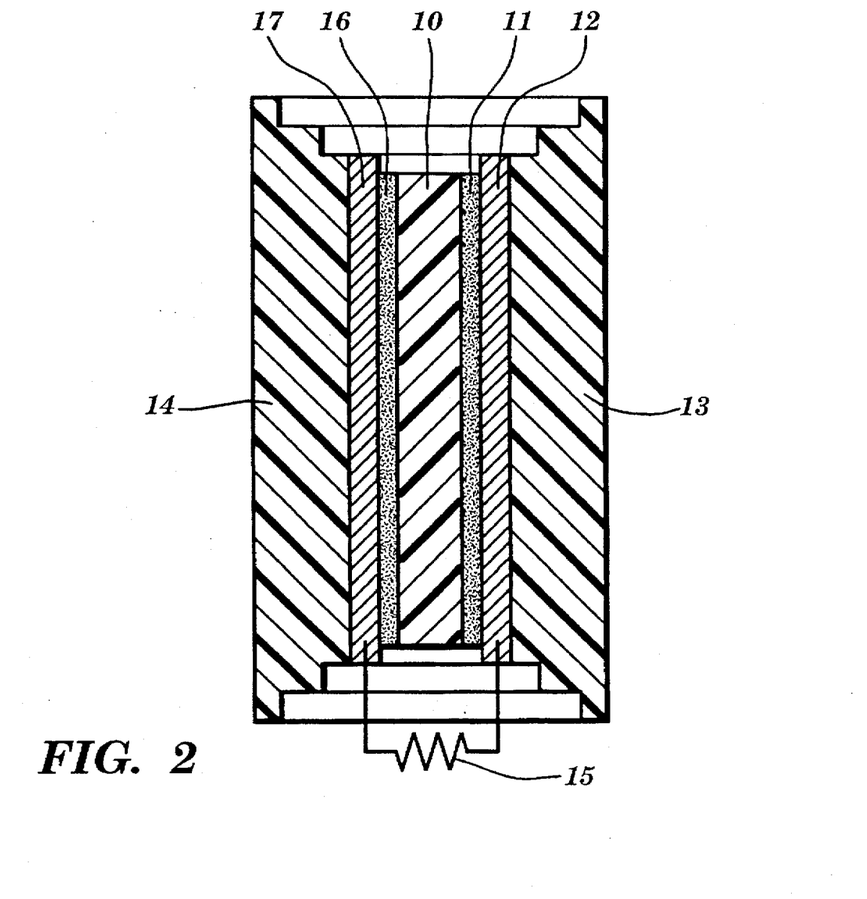
FIG. 2 is a schematic diagram of a typical fuel cell incorporating a membrane of the invention.

A typical cell is shown in FIG. 2. It comprises an ion-conducting membrane 10, a catalyst electrode 11, current collector 12 and oxidant manifold 13. On the opposite side of the membrane 10 are a second catalyst electrode 16, a second current collector 17, and a fuel manifold 14.

Its operation as a fuel cell is described as follows with hydrogen as the fuel, but any oxidizable fuel could be used. Hydrogen is fed into the fuel manifold 14. Hydrogen reacts with catalyst electrode 16 to form protons. The electrons which are formed by the interaction of the hydrogen and catalyst in the hydrogen electrode are collected by the hydrogen current collector 17 and fed into the external electrical load 15. The protons are absorbed by the ion-conducting membrane 10. Oxygen is fed into the oxidant manifold 13. The oxygen reacts with the catalyst in the oxygen electrode and the electrons returning from the external electrical load 15 through the oxygen current collector 12 to form oxygen radicals within the catalyst electrode 11. Protons from the ion-conducting membrane 10 seek out the oxygen radicals driven by the electrical potential created by the formation of the oxygen radicals. Protons combine with the oxygen radicals to form water in the oxygen electrode completing the electro-chemical circuit. The water is released by the electrode 11 and removed from the cell through the manifold 12.

While the invention has been particularly shown and described with reference to preferred embodiments thereof, it will be understood by those skilled in the art that other changes in form and details may be made therein without departing from the spirit and scope of the invention.

We claim:

1. A highly sulfonated polymeric membrane produced by the process of:

(a) preparing a polymer solution by combining (i) a copolymer which comprises at least one vinyl aromatic polymer segment chosen from the group:

bonded to at least one flexible connecting polymer segment chosen from the group:

and the group:

wherein $R^1$, $R^2$, $R^3$ and $R^4$ are chosen independently from the group consisting of hydrogen, phenyl and lower alkyl;

$R^5$ is hydrogen, chlorine or lower alkyl;

$R^6$ is hydrogen or methyl;

$R^7$ is $-SO_3H$, $-P(O)(OR^8)OH$, $-R^9-SO_3H$ or $-R^9-P(O)(OR^8)OH$ where $R^8$ is hydrogen or lower alkyl and $R^9$ is lower alkylene;

Ar is phenyl; and m, n, p and q are zero or integers from 50 to 10,000, with (ii) a sulfonation agent, under controlled reaction conditions, and within a compatible solvent system;

(b) removing a portion of the solvents from the polymer solution; and (c) casting the resulting material on a substrate, to form a membrane that absorbs at least about 50% of its weight in water, that in its fully-hydrated state can be stretched by at least about 10% of its original dimension without fracture, and that exhibits a conductivity of at least about $10^{-5}$ S/cm.

2. The polymeric membrane of claim 1, wherein the controlled reaction conditions include the mixture of components (i) and (ii) at a temperature below about 5° C., followed by mixing at an elevated temperature until a purplish color appears in the mixture.

3. The polymeric membrane of claim 1, wherein the compatible solvent system comprises:

(I) a solvent mixture of a halogenated solvent and a hydrocarbon solvent; and (II) a second solvent or solvent mixture used after component (i) has become sulfonated, selected from the group consisting of ethanol, n-propanol, butanol, and pentanol.

4. The polymeric membrane of claim 1, wherein the vinyl aromatic polymer segment is derived from polystyrene or poly(alpha-methylstyrene).

5. The polymer membrane of claim 1, wherein the flexible connecting polymer segment is derived from a polymer selected from the group consisting of poly(alpha-olefins), polydienes, and hydrogenated derivatives of polydienes.

6. The polymer membrane of claim 1, wherein component (i) is a styrene-(ethylene-butylene)-styrene triblock copolymer.

7. The polymer membrane of claim 1, wherein step (a) results in a copolymer which is sulfonated to the extent of at least 25 mol %.

8. The polymer membrane of claim 1, wherein the sulfonation agent is selected from the group consisting of sulfuric acid/acetic anhydride; sulfur trioxide/acetic acid; sulfur trioxide/lauric acid; chlorosulfonic acid/lauric acid; chlorosulfonic acid; and trimethylsilyl-sulfonyl chloride.

9. The polymer membrane of claim 1, wherein the sulfonation agent comprises sulfur trioxide, and is used in combination with a moderator for the sulfonation reaction.

10. The polymer membrane of claim 9, wherein the moderator is selected from the group consisting of phosphorus pentoxide, triethyl phosphate, and tris(2-ethylhexyl) phosphate.

11. The polymer membrane of claim 1, wherein step (a) further includes the incorporation of an antioxidant agent.

12. The polymer membrane of claim 11, wherein the antioxidant agent is selected from the group consisting of hindered phenolic compounds and oligomers containing hindered phenolic compounds.

13. The polymer membrane of claim 12, wherein the oligomer is a low molecular weight phenol-formaldehyde resin.

14. The polymer membrane of claim 1, wherein step (a) further includes the incorporation of an acidic agent capable of reacting with methanol to form a methyl ester.

15. The polymer membrane of claim 14, wherein the acidic agent is a carboxylic acid or a polymer containing a carboxylic acid.

16. The polymer membrane of claim 14, wherein the acidic agent is incorporated by blending with component (i).

17. The polymer membrane of claim 14, wherein the acidic agent is a carboxylic acid-containing monomer, and is incorporated by polymerization with component (i).

18. A direct-methanol fuel cell, comprising the polymer membrane of claim 14.

19. A highly sulfonated polymeric membrane according to claim 1 wherein said vinyl aromatic polymer segment is selected from the group comprising sulfonic acids of polystyrene and poly(α-methylstyrene), and said flexible connecting polymer segment is selected from the group comprising poly(alphaolefins), polydienes, and hydrogenated derivatives of polydiene.

20. A process for preparing a mechanically stable, ion-conducting membrane, comprising the steps of:

(a) preparing a polymer solution by combining (i) a copolymer which comprises at least one vinyl aromatic polymer segment chosen from the group:

bonded to at least one flexible connecting polymer segment chosen from the group:

and the group;

wherein $R^1$, $R^2$, $R^3$ and $R^4$ are chosen independently from the group consisting of hydrogen, phenyl and lower alkyl;

$R^5$ is hydrogen, chlorine or lower alkyl;

$R^6$ is hydrogen or methyl;

$R^7$ is $-SO_3H$, $-P(O)(OR^8)OH$, $-R^9-SO_3H$ or $-R^9-P(O)(OR^8)OH$ where $R^8$ is hydrogen or lower alkyl and $R^9$ is lower alkylene;

Ar is phenyl; and m, n, p and q are zero or integers from 50 to 10,000, with (ii) a sulfonation agent, under controlled reaction conditions, and within a compatible solvent system;

(b) removing a portion of the solvents from the polymer solution; and (c) casting the resulting material on a substrate, to form a membrane that absorbs at least about 50% of its weight in water, that in its fully-hydrated state can be stretched by at least about 10% of its original dimension without fracture, and that exhibits a conductivity of at least about $10^{-5}$ S/cm.

21. A process according to claim 20, wherein the styrene-(ethylene-butylene)-styrene triblock copolymer has a number average molecular weight of about 50,000, and wherein styrene units comprise about 30 to 35 wt % of said triblock copolymer.

22. A process according to claim 20 wherein said membrane is more than 40 mol % sulfonated.

23. The process of claim 20, wherein the sulfonation agent is selected from the group consisting of sulfuric acid/acetic anhydride; sulfur trioxide/acetic acid; sulfur trioxide/lauric acid; chlorosulfonic acid/lauric acid; chlorosulfonic acid; and trimethylsilyl-sulfonyl chloride.

24. A process according to claim 20 wherein said vinyl aromatic polymer segment is selected from the group comprising sulfonic acids of polystyrene and poly($\alpha$-methylstyrene) and said flexible connecting polymer segment selected from the group comprising poly(alpha-olefins), polydienes, and hydrogenated derivatives of polydienes.

25. A process for preparing a mechanically stable, ion-conducting membrane comprising the steps of:

(a) adding about a 3–4 wt % solution containing about 3.6 equivalents of styrene-(ethylene-butylene)-styrene triblock copolymer and about 0.4 equivalents of triethylphosphate in about 65/35 dichloroethane/cyclohexane with about 2.0 equivalents of sulfur trioxide in dichloroethane to a solution of about 65/35 dichloroethane/cyclohexane, at a temperature in the range of about $-5°$ to $0°$ C.;

(b) stirring for about 10 to 15 minutes at about $-5°$ to $0°$ C.;

(c) heating at about 80° C. for about 10 to 15 minutes until a purplish color is evident;

(d) cooling to less than about 55° C., and then adding a suitable solvent to form a polymer solution;

(e) evaporating most of the dichloroethane and cyclohexane at about 40°–50° C. to obtain a viscous liquid;

(f) casting the viscous liquid on a substrate to form a membrane that absorbs at least about 50% of its weight in water, that in its fully-hydrated state can be stretched to at least about 100% of its original dimension without fracture, and that exhibits a conductivity of at least about $10^{-5}$ S/cm.

* * * * *